United States Patent
Shetty et al.

(10) Patent No.: US 9,953,222 B2
(45) Date of Patent: Apr. 24, 2018

(54) SELECTING AND PRESENTING REPRESENTATIVE FRAMES FOR VIDEO PREVIEWS

(71) Applicant: Google LLC, Mountain View, CA (US)

(72) Inventors: Sanketh Shetty, Sunnyvale, CA (US); Tomas Izo, San Francisco, CA (US); Min-Hsuan Tsai, Grapevine, TX (US); Sudheendra Vijayanarasimhan, Mountain View, CA (US); Apostol Natsev, Sunnyvale, CA (US); Sami Abu-El-Haija, San Francisco, CA (US); George Dan Toderici, Mountain View, CA (US); Susanna Ricco, Redwood City, CA (US); Balakrishnan Varadarajan, Sunnyvale, CA (US); Nicola Muscettola, Sunnyvale, CA (US); WeiHsin Gu, Redwood City, CA (US); Weilong Yang, Fremont, CA (US); Nitin Khandelwal, Milpitas, CA (US); Phuong Le, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 77 days.

(21) Appl. No.: 14/848,216

(22) Filed: Sep. 8, 2015

(65) Prior Publication Data
US 2016/0070962 A1    Mar. 10, 2016

Related U.S. Application Data

(60) Provisional application No. 62/047,639, filed on Sep. 8, 2014, provisional application No. 62/120,107, filed on Feb. 24, 2015.

(51) Int. Cl.
*G06K 9/00* (2006.01)
*G06F 17/30* (2006.01)

(52) U.S. Cl.
CPC ... *G06K 9/00718* (2013.01); *G06F 17/30787* (2013.01); *G06K 2209/27* (2013.01)

(58) Field of Classification Search
CPC ............ G06K 9/00718; G06K 2209/27; G06F 17/30787
See application file for complete search history.

(56) References Cited

U.S. PATENT DOCUMENTS

| | | | |
|---|---|---|---|
| 6,535,639 B1 | 3/2003 | Uchihachi et al. | |
| 7,627,823 B2 * | 12/2009 | Takahashi | G11B 27/031 382/224 |

(Continued)

OTHER PUBLICATIONS

PCT International Search Report and Written Opinion for PCT/162015/056783, dated Dec. 14, 2015, 12 Pages.

*Primary Examiner* — Bhavesh Mehta
*Assistant Examiner* — Menatoallah Youssef
(74) *Attorney, Agent, or Firm* — Byrne Poh LLP

(57) ABSTRACT

A computer-implemented method for selecting representative frames for videos is provided. The method includes receiving a video and identifying a set of features for each of the frames of the video. The features including frame-based features and semantic features. The semantic features identifying likelihoods of semantic concepts being present as content in the frames of the video. A set of video segments for the video is subsequently generated. Each video segment includes a chronological subset of frames from the video and each frame is associated with at least one of the semantic features. The method generates a score for each frame of the subset of frames for each video segment based at least on the semantic features, and selecting a representative frame for each video segment based on the scores of the frames in the video segment. The representative frame represents and summarizes the video segment.

20 Claims, 12 Drawing Sheets

(56) References Cited

U.S. PATENT DOCUMENTS

| | | | |
|---|---|---|---|
| 8,473,981 B1* | 6/2013 | Gargi | G06F 17/30817 |
| | | | 725/40 |
| 2008/0155627 A1 | 6/2008 | O'Connor et al. | |
| 2011/0267544 A1 | 11/2011 | Mei et al. | |
| 2012/0206567 A1* | 8/2012 | Zafarifar | H04N 7/025 |
| | | | 348/42 |
| 2013/0114902 A1* | 5/2013 | Sukthankar | H04N 9/8205 |
| | | | 382/190 |
| 2013/0300939 A1* | 11/2013 | Chou | G06K 9/00765 |
| | | | 348/700 |
| 2014/0037216 A1* | 2/2014 | Kumar | G06K 9/00751 |
| | | | 382/197 |
| 2017/0185846 A1* | 6/2017 | Hwangbo | G06K 9/00751 |

\* cited by examiner

| Segment Table 320 | | | | |
|---|---|---|---|---|
| Segment | Start Time | End Time | Representative Frame | Semantic Concepts |
| S1,1 | 0:00 | 4:25 | 0:57 | Giraffe |
| S2,1 | 0:00 | 5:13 | 2:45 | Giraffe |
| S3,1 | 0:00 | 8:35 | 6:26 | Lion, Gazelle |
| S1,2 | 4:25 | 8:05 | 4:45 | Lion |
| S2,2 | 5:13 | 7:47 | 6:26 | Lion, Gazelle |
| S2,3 | 7:47 | 12:10 | 10:05 | Lion |

⋮

700    bulldog skateboarding

Filters ▼

Tillman the Skateboarding Bulldog Skates, S
   710A

Skateboarding Bulldogs a Compilation and T
   710B

DHTV Skateboarding Bulldog
   710C

SELECTING AND PRESENTING REPRESENTATIVE FRAMES FOR VIDEO PREVIEWS

CROSS-REFERENCE TO RELATED APPLICATION(S)

This application claims priority under 35 U.S.C. § 119(e) to U.S. Provisional Patent Application Ser. No. 62/047,639, entitled "Selecting Representative Frames for Video Previews" filed Sep. 8, 2014, and U.S. Provisional Patent Application Ser. No. 62/120,107, entitled "User Interfaces for Visualizing Scenes Within a Video" filed Feb. 24, 2015, which are incorporated herein by reference in their entirety.

BACKGROUND

1. Field of Art

This disclosure generally relates to presenting representative video summaries to a user, and specifically to selecting representative video summaries using semantic features.

2. Background

Video hosting systems store and serve videos to client devices. As these video hosting systems become increasingly popular, the video hosting systems increasingly store longer-form videos, sometimes exceeding several hours in length. These longer-form videos may show a wide variety of topics and settings and depict many different scenes and objects within the video. For example, a wildlife video titled "Animals of the Serengeti" may show many different animals, such as lions, gazelles, elephants, and hyenas. These animals may be shown in a wide variety of settings, such as when grazing, migrating, or during a chase. When users browse videos, the video hosting service provides some portion of a video as a preview of the video, such as a single frame from the beginning of the video. For longer-form videos, selection of a preview typically fails to accurately represent the full content of the video and a user is not able to quickly distinguish whether a particular video has desired content without watching the video itself. In the "Animals of the Serengeti" example, this preview may show a frame of a lion resting, but the user would not be able to determine that the video also includes migrating gazelle without watching the video.

SUMMARY

A video hosting service presents representative frames from a video to a user in a preview of the video. This permits a user to receive additional context about the video and determine whether to select that video to view. The video hosting service analyzes videos received by the video hosting service to generate features describing individual frames within a video. Such features include low-level information describing the frame, such as color, motion, and audio features, as well as semantic features predicting the presence of various concepts within the frame. Such concepts identified in the frame include, for example, that the frame includes a particular type of object ("lion") or an action ("hunt").

The video hosting service identifies segments within the video based on the features of the video. Each segment identifies a portion of consecutive frames of the video that are to be summarized together. In one embodiment each segment is determined by identifying shot boundaries in the video. After identifying a set of segments, the video hosting system analyzes each segment and identifies a representative frame that may be used to summarize that segment to a user. To identify a representative frame, the video hosting system determines which semantic concepts are within the segment and scores each frame within the segment according to a likelihood it contains semantic concepts of the segment. In one embodiment, a score combines scores from multiple semantic concepts of the frame, which may permit frames that include multiple concepts of the segment to receive a higher score than frames that include a single concept of the segment. The score for each frame may also include an aesthetic score for the frame indicating its photo quality. The frame in a segment with the highest score is selected as the representative frame for the segment. The photo quality may be measured by sharpness, contrast, and so forth. In various embodiments, the semantic score is combined with the aesthetic score to determine a total score for the frame. The frame in a segment with the highest total score is selected as a representative frame for that segment.

In one embodiment, segments of a video are identified by one or more different segmenting techniques. The segments identified by each technique are termed a segment set, and the segments in the segment sets may be overlapping portions of the original video. Thus, the video may be segmented in multiple different ways by the various segment sets. A representative frame for each of the segments of each segment set is determined. As a result of the multiple segment sets, the video hosting system identifies representative frames for the video based on the techniques used for segmenting the video, increasing the likelihood that the representative frames capture alternative portions of the video. The segments and associated representative frames are stored as entries in a segment table. The entries indicate the portion of the video of the segment, the representative frame of the segment, and the concepts associated with that representative frame.

The video hosting system receives a request to summarize a video. The request to summarize the video may be based on a user browsing videos in the video hosting system, or may be based on a search query associated with the request. The video hosting system identifies segments in the segment table that are relevant to the request by comparing the semantic concepts of the segments with semantic concepts associated with the request. The semantic concepts associated with the request are determined by analysis of a search query, user interest information, or by identifying semantic concepts associated with metadata of the video. When there has not been a search, in some embodiments all segments in the segment table are treated as relevant.

Next, from among the relevant segments, a set of representative segments is selected. One or more representative segments can be selected. The relevant segments are scored based on the match between the relevant segment and the semantic concepts associated with the query. After scoring, a set of representative segments is selected from among the relevant segments to summarize the video. The video hosting system selects segments that have the highest score and that reflect diversity among the semantic concepts associated with the selected segments. The representative frames associated with the selected segments are used to generate a summary of the video. The summary chronologically combines the representative frames and presents a series of the frames to the user. The video summary is provided to the user who may determine whether to view the entire video.

During viewing of a video, the user may also be presented with indications of relevant segments or representative frames while the video plays. The representative frames may be selected in various ways, such as by matching the search query or user profile to the semantic concepts in the segments of the viewed video. In one example, representative frames for additional segments are shown adjacent to the video that is being played. In another example, one or more markers are displayed on a timeline of the video that is being played. These markers indicate when the representative frames for various segments occur. Because the representative frames are associated with relevant segments and are selected based on a user's context (e.g., the profile or search query), the representative frames are likely to indicate frames of particular interest to the user. By displaying these frames while playing the video, the video hosting system permits a user to easily identify portions of the video that are particularly likely to be of interest to the user without manually seeking portions of the video.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present disclosure for purposes of illustration only. One skilled in the art will readily recognize from the following description that alternative embodiments of the structures and methods illustrated herein may be employed without departing from the principles of the disclosure described herein.

DETAILED DESCRIPTION

System Architecture

Figure 1:
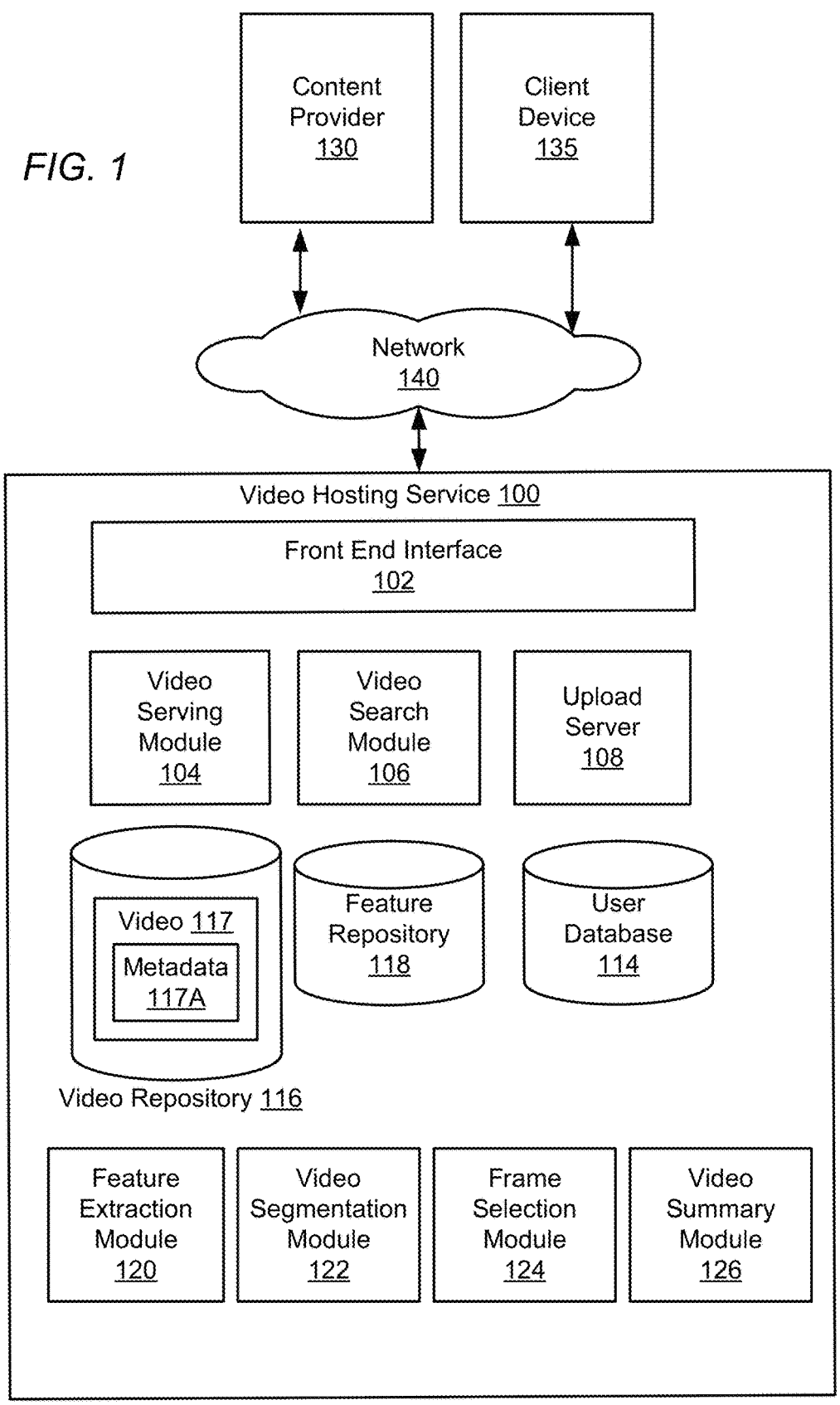
FIG. 1 is a block diagram of an example video hosting service in which video previews are generated using semantic features of video segments, according to one embodiment.

FIG. 1 is a block diagram of a video hosting service 100 in which video previews are generated using semantic features of video segments. A video preview is a portion of a video, such as a frame, set of frames, animation, or other summary of the video that may be displayed to the user for the user to determine the content of the video. The user may use the preview to determine whether to request the video to view. The video hosting service 100 stores and provides videos to clients such as the client device 135. The video hosting site 100 communicates with a plurality of content providers 130 and client devices 135 via a network 140 to facilitate sharing of video content between users. In FIG. 1, for the sake of clarity only one instance of content provider 130 and client 135 is shown, though there could be any number of each. The video hosting service 100 includes a front end interface 102, a video serving module 104, a video search module 106, an upload server 108, a user database 114, a video repository 116, and a feature repository 118.

The video hosting service 100 also includes components for selecting and serving representative previews of a video, such as feature extraction module 120, video segmentation module 122, frame selection module 124, and video summary module 126. Other conventional features of the video hosting service 100, such as firewalls, load balancers, authentication servers, application servers, failover servers, and site management tools are not shown so as to more clearly illustrate the features of the video hosting site 100. The illustrated components of the video hosting website 100 can be implemented as single or multiple components of software or hardware. In general, functions described in one embodiment as being performed by one component can also be performed by other components in other embodiments, or by a combination of components. Furthermore, functions described in one embodiment as being performed by components of the video hosting website 100 can also be performed by one or more client devices 135 in other embodiments if appropriate.

Client devices 135 are computing devices that execute client software, e.g., a web browser or built-in client application, to connect to the front end interface 102 of the video hosting service 100 via a network 140 and to display videos. The client device 135 used in these embodiments include, for example, a personal computer, a personal digital assistant, a cellular, mobile, or smart phone, or a laptop computer.

The network 140 is typically the Internet, but may be any network, including but not limited to a LAN, a MAN, a WAN, a mobile wired or wireless network, a cloud computing network, a private network, or a virtual private network. Client device 135 may comprise a personal computer or other network-capable device such as a personal digital assistant (PDA), a mobile telephone, a pager, a television "set-top box," and the like.

Conceptually, the content provider 130 provides video content to the video hosting service 100 and the client 135 views that content. In practice, content providers may also be content viewers. Additionally, the content provider 130 may be the same entity that operates the video hosting site 100.

The content provider 130 operates a client device to perform various content provider functions. Content provider functions may include, for example, uploading a video file to the video hosting website 100, editing a video file stored by the video hosting website 100, or editing content provider preferences associated with a video file.

The client device 135 is a device operating to view video content stored by the video hosting site 100. Client device 135 may also be used to configure viewer preferences related to video content. In some embodiments, the client device 135 includes an embedded video player such as, for example, the FLASH player from Adobe Systems, Inc. or any other player adapted for the video file formats used in the video hosting website 100. Note that the terms "client" and "content provider" as used herein may refer to software providing both client and content providing functionality, to hardware on which the software executes. A "content provider" also includes the entities operating the software and/or hardware, as is apparent from the context in which the terms are used.

The upload server 108 of the video hosting service 100 receives video content from a client devices 135. Received content is stored in the video repository 116. In response to requests from client devices 135, a video serving module 104 provides video data from the video repository 116 to the client devices 135. Client devices 135 may also search for videos of interest stored in the video repository 116 using a video search module 106, such as by entering textual queries containing keywords of interest. The video search module 106 may request a preview of any videos in the search results from the video summary module 126 as further described herein. Front end interface 102 provides the interface between client 135 and the various components of the video hosting site 100. In particular, the front end interface 102 provides a video preview interface to a user to permit a user to review videos in a summary format prior to viewing an interface displaying the full video itself.

In some embodiments, the user database 114 is responsible for maintaining a record of all registered users of the video hosting server 100. Registered users include content providers 130 and/or users who simply view videos on the video hosting website 100. Each content provider 130 and/or individual user registers account information including login name, electronic mail (e-mail) address and password with the video hosting server 100, and is provided with a unique user ID. This account information is stored in the user database 114. The user database 114 may also store user interests associated with users. The user interests may be determined by prior videos viewed by the user or by interests entered by the user, or by user activity on other sites besides the video hosting service 100.

The video repository 116 contains a set of videos 117 submitted by users. The video repository 116 can contain any number of videos 117, such as tens of thousands or hundreds of millions. Each of the videos 117 has a unique video identifier that distinguishes it from each of the other videos, such as a textual name (e.g., the string "a91qrx8"), an integer, or any other way of uniquely naming a video. The videos 117 can be packaged in various containers such as AVI, MP4, or MOV, and can be encoded using video codecs such as MPEG-2, MPEG-4, WebM, WMV, H.263, H.264, and the like. In addition to their audiovisual content, the videos 117 further have associated metadata 117A, e.g., textual metadata such as a title, description, and/or tags. The video metadata 117A also stores a segment table maintaining an identification of segments of the video. Each segment indicates a set of sequential frames that belong to the same shot of video. The segments are also stored in the segment table with an indication of the start and stop time of the segment, in addition to a representative frame of the segment. The representative frame is a frame from the segment that was selected to be displayed to summarize the segment in a preview. For example, the segment may be identified as beginning at 4:25 and ending at 8:05, with an identified representative frame of 4:45. When this segment is used to summarize a video, the representative frame of 4:45 is used to summarize that segment as further described herein. In addition, each segment in the segment table is identified as including one or more semantic concepts.

A features repository 118 stores, for videos of the video repository 116, associated sets of features that characterize the videos with respect to one or more types of visual or audio information, such as color, motion, and audio information. The features of a video 117 are distinct from the raw content of the video itself and are derived from it by a feature extraction module 120. In one embodiment, the features are stored as a vector of values, the vector having the same dimensions for each of the videos 117 for purposes of consistency.

The features extracted using the feature extraction module 120 in one embodiment are visual low-level frame-based features. For example, one embodiment uses a color histogram, histogram of oriented gradients, color-differencing with adjacent frames, motion features, and feature tracking, though other frame-based features can be used. The features extracted are collected on a per-frame basis and could comprise other frame-based features such as an identified number of faces or a histogram of oriented optical flow, and may comprise a combination of extracted features. Further features are extracted in other embodiments, such as a Laplacian-of-Gaussian (LoG) or Scale Invariant Feature Transform (SIFT) feature extractor, a color histogram computed using hue and saturation in HSV color space, motion rigidity features, texture features, filter responses (e.g. derived from Gabor wavelets), including 3D filter responses, edge features using edges detected by a Canny edge detector, gradiant location and orientation histogram (GLOH), local energy-based shape histogram (LESH), or speeded-up robust features (SURF). Additional audio features can also be used, such as volume, an audio spectrogram, speech-no-speech indicators, or a stabilized auditory image. The features may also include intermediate layer outputs of a deep neural network trained for a variety of image and video recognition, classification, or ranking tasks. Optionally, in order to reduce the dimensionality of these features while maintaining the discriminating aspects, the features are reduced. The feature reduction is performed in one embodiment using a learned linear projection using principal component analysis to reduce the dimensionality of the feature vectors to 50, or some other suitable number less than 100. Other embodiments can use additional techniques to reduce the number of dimensions in the feature vectors when desired.

The feature extraction module 120 may also include a plurality of semantic classifiers to determine semantic features relating to a set of semantic concepts. A semantic concept is a label assigned to the content of a video or frame, and may be correspond to an entity, such as "dog" or "cat" or free text, such as "dog chasing cat." The set of semantic concepts varies by implementation, and may include, for example, 25,000 concepts. The semantic classifiers are computer models that receive a designation of a frame and features thereof and output a likelihood that the frame is relevant to or depicts a particular semantic concept. For example, a semantic classifier for the semantic concept "dog" determines a likelihood that the frame contains the semantic concept "dog." The likelihood may be determined within a range, for example between 0 and 1. This likelihood that the frame contains the semantic concept is stored as a semantic feature of the frame. Each semantic concept is associated with a semantic classifier, and the feature extraction module 120 applies the semantic classifiers to determine semantic features for the set of semantic concepts. In this embodiment, a set of semantic features is generated for each of the semantic concepts using the semantic classifiers, and the set of semantic features is associated with each frame in the video and stored in feature repository 118. Semantic classifiers may also be used to determine the semantic concepts present in a video as a whole or for a particular segment or portion of a video. The semantic classifiers are trained by a classifier training module (not shown) that trains a semantic classifier using supervised data (e.g., a specific human designation that a frame or video belongs to the semantic concept) or by inferring labels from data associated with the video (e.g., metadata of the video).

The video segmentation module 122 identifies segments of the video. To identify segments in the video, the video segmentation module 122 analyzes the visual and audio features of the frames in the video. The video segmentation module 122 may apply one or a combination of different techniques for determining shot boundaries within a video. In some embodiments, multiple of these methods are applied to identify more than one set of segments in the video.

The video segmentation module 122 may use classifiers to identify video segments. The classifier is trained using labeled shot boundaries as a positive feature set and frames near the boundary as a hard-negative training set. The features of a frame analyzed by this classifier may include color differences with adjacent frames, motion features, audio volume, and audio speech detection. The video segmentation module 122 applies the classifier to frames of the video to determine whether each frame is a shot boundary.

In one embodiment, the video segmentation module 122 identifies segments of videos by using coherence of the frame features. The coherence measures similarity of features in a predetermined temporal segment. The predetermined temporal segment is a short segment of video for measuring similarities between the frames. This similarity provides a distance measure to an unsupervised clustering/segmentation algorithm, such as agglomerative clustering, affinity propagation, or spectral clustering. The output of this algorithm identifies segments of the video.

The video segmentation module 122 may identify video segments by tracking visual features across frames. The video segmentation module 122 identifies a frame as a segment boundary when more than a threshold number or fraction of features change between those frames including the frame. The video segmentation module 122 may use one or combination of the techniques described above to identify video segments. Subsequently, the video segmentation module 122 provides the identified segments to the frame selection module 124.

The frame selection module 124 identifies, for each video segment, a representative frame to represent and summarize the video segment. The representation frame is a frame that is most representative of the concepts in the video segment. When identifying a representative frame, the frame selection module 124 scores the frames of the segment according to the semantic features of the frames and compares the semantic features of the frames to those of the video segment. The frame selection module 124 may also generate an aesthetic score associated with the frames and generate a combined score for a frame. The combined score for a frame accounts for the semantic score and the aesthetic score. From among the combined scores of the frames for a segment, the frame selection module 124 selects the frame with the highest score as the representative frame for the video segment.

To generate a semantic score for a frame, the frame selection module 124 identifies the semantic concepts present in the video segment by identifying semantic concepts in each frame. Semantic concepts in a frame are added to a set of semantic concepts for the video segment when the semantic feature for the concept in a frame is higher than a threshold, such as 40, 50, or 60% likelihood of the semantic concept being present in the frame. For each of the semantic concepts identified in the segment, the frame selection module 124 determines a score for that concept in the frame by determining the amount that the concept is present in the frame compared to a reference value. The reference value may be the mean, median, minimum, or maximum value semantic feature of the concept in the frames of the segment, or may be zero. The frame selection module 124 sums the scores for each concept to generate a semantic score for each frame. By summing the scores for each concept present in the segment, a frame that includes multiple concepts in the segment is more likely to be selected as the representative frame for the segment. For example, a segment that depicts a lion chasing a gazelle includes some frames depicting only the lion, some depicting only the gazelle, and some depicting a combination of the lion and gazelle. In this example, the frames depicting both the lion and the gazelle receive a semantic score that accounts for the presence of both the lion and gazelle.

In one embodiment, calculating semantic scores for a frame includes a linear combination of semantic concepts represented by labels and likelihood of the semantic concepts in a given frame. As one example, the semantic score S for a frame f is determined according to Equation (1):

$$S(f)=\text{sum}\_c(\text{concept\_segment}(c)*\text{likelihood}(c,f)) \quad (1),$$

where sum_c indicates a sum for each semantic concept in the segment, concept_segment(c) indicates how salient a semantic concept is to the segment (e.g., a mean likelihood over all frames in the segment), and likelihood (c,f) is the likelihood of the semantic concept c in the frame f (the concept score for this particular frame). Thus, the semantic score S sums, for each semantic concept in the segment, prevalence of the semantic concept in the segment multiplied by the likelihood of the semantic concept in the frame. Accordingly, the semantic score for a frame emphasizes the frames of which the semantic concepts (represented by likelihood (c,f)) are prevalent throughout the video segment (represented by concept_segment(c)).

In addition to a semantic score, in one embodiment the scoring also includes aesthetic scores to assist in selection of a representative frame that is also aesthetically pleasing. The aesthetic score is determined for each frame and determined using individual qualities, such as the amount of motion, sharpness, distance from the segment boundary (e.g., the first and last frame of the segment), and photo quality. Each of these aesthetic qualities is combined to determine an aesthetic score for the frame, and may be combined using a machine learned model, by summation, or by another means.

The frame selection module 124 combines the semantic score and aesthetic score to generate a combined score for each frame which is used to identify the frame selected as representative for the segment. The scores may be normalized prior to combination, and the combination may be based on a computer-learned model, or may be a summation of scores.

To normalize the scores, a function may be computed for the semantic and aesthetic scores, for example the average, maximum, minimum, noisy-or, or k-noisy-or. These functions can be computed on normalized or unnormalized values of the signals. The normalization (e.g. mapping scores to 0-1), may be calculated within the segment, within a window of frames around the frame being scored, or using scores across the video, or using scores across sample videos in the database.

The frame selection module 124 determines the combined score in one embodiment by applying a computer-learned model that receives the aesthetic score and semantic score as inputs. The computer-learned model may be trained in various ways, for example using pairwise data (frame x is better than frame y) or using regression (frame x has score s). The model may also be performed using scores that are not normalized as described above.

After determination of the combined score for each frame in the segment, the frame selection module 124 ranks the frames in the segment according to the combined scores. The frame selection module 124 selects the highest-ranked frame (i.e., the frame with the highest combined score) as the representative frame for that segment. In one embodiment, the frame selection module 124 selects a representative frame using only the highest semantic score from among the frames. The frame selection module 124 may also select representative audio for the frame using similar techniques and select a portion of audio spanning several frames. The representative audio may be selected from the audio at the frames surrounding the selected representative frame. After the frame selection module 124 selects a representative frame, the representative frame is stored with the segment designation in a segment table associated with the video. The semantic concepts associated with the representative frame may also be stored in the segment table. In one embodiment, the frame selection module 124 receives multiple sets of segments from the video segmentation module 122. The multiple sets of segments are determined by using different methods of segmenting the video. Each of these sets of segments may be stored with the segment table and with an associated representative frame for each segment.

In one embodiment, the representative frame selection and video segmentation is performed by the frame selection module 124 and video segmentation module 122 prior to a video being provided to a client device 135 for viewing. The representative frames may be identified when a new video is received by the upload serve 108. By identifying representative frames and generating the segment table when uploaded (or prior to a request to view the video), the segment table is available to identify representative frames for display prior to user requests.

Figure 2:
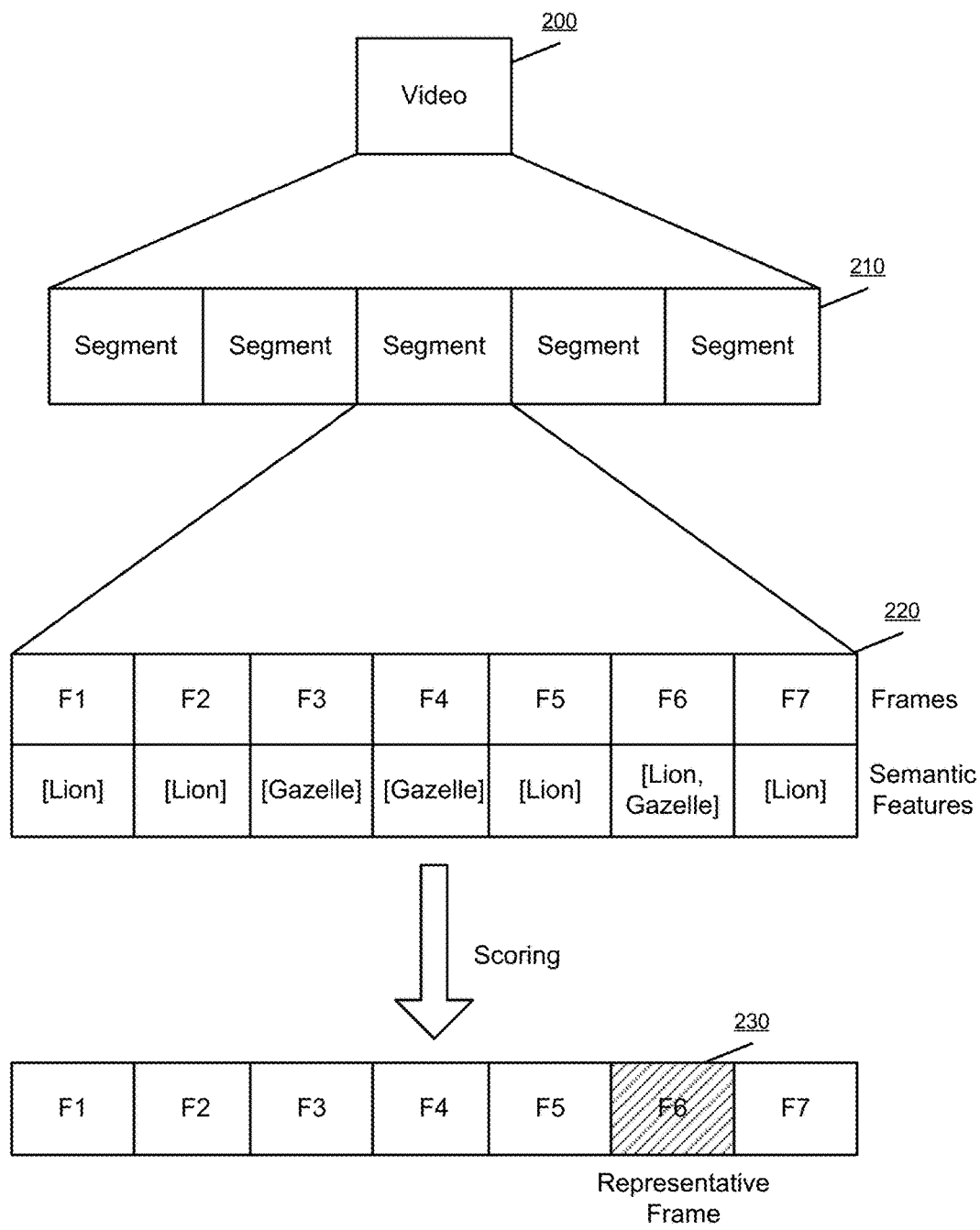
FIG. 2 illustrates the segmentation of a video and selection of a representative frame, according to one embodiment.

FIG. 2 illustrates the segmentation of a video and selection of a representative frame, according to one embodiment. The segmentation and selection of a representative frame is performed as described above by the components of the video hosting service 100. Video 200 is segmented into a set of segments 210 by the video segmentation module 120. Each of the segments includes a chronological set of frames 220, shown here as frames $F_1$-$F_7$. Each of the frames is associated with a set of semantic features identified by the feature extraction module 120. In this example, the illustrated segment is a segment showing a lion chasing a gazelle. In the segment, initially the frames depict a lion, then at frame $F_3$ and $F_4$ a gazelle is shown, and a lion begins chasing the gazelle at $F_5$ and are both in-frame and identified in $F_6$, and the lion alone is identified in $F_7$. As described above, these semantic features in one embodiment identify a likelihood of a semantic concept being present in a frame, and while displayed here as "present," the semantic concepts may only indicate that a particular concept, e.g., "lion" is likely or highly likely present in a frame or may include a floating point likelihood or probability of the concept occurring in the frame. After scoring the semantic concepts in the frame, the frame selection module 124 selects frame $F_6$ as the representative frame in this segment. When scoring the frames, the frame selection module 124 identifies that the semantic concepts associated with the segment are "lion" and "gazelle." Frame $F_6$, as including both lion and gazelle, receives a score for each concept and a total semantic score accounting for each. After optionally generating a combined score accounting for an aesthetic score, Frame $F_6$ is selected as the representative frame 230. In practice, multiple frames are likely to include the concepts "lion" and "gazelle." Incorporating the aesthetic score may assist in identifying which of these frames is aesthetically most pleasing to a user.

Figure 3:
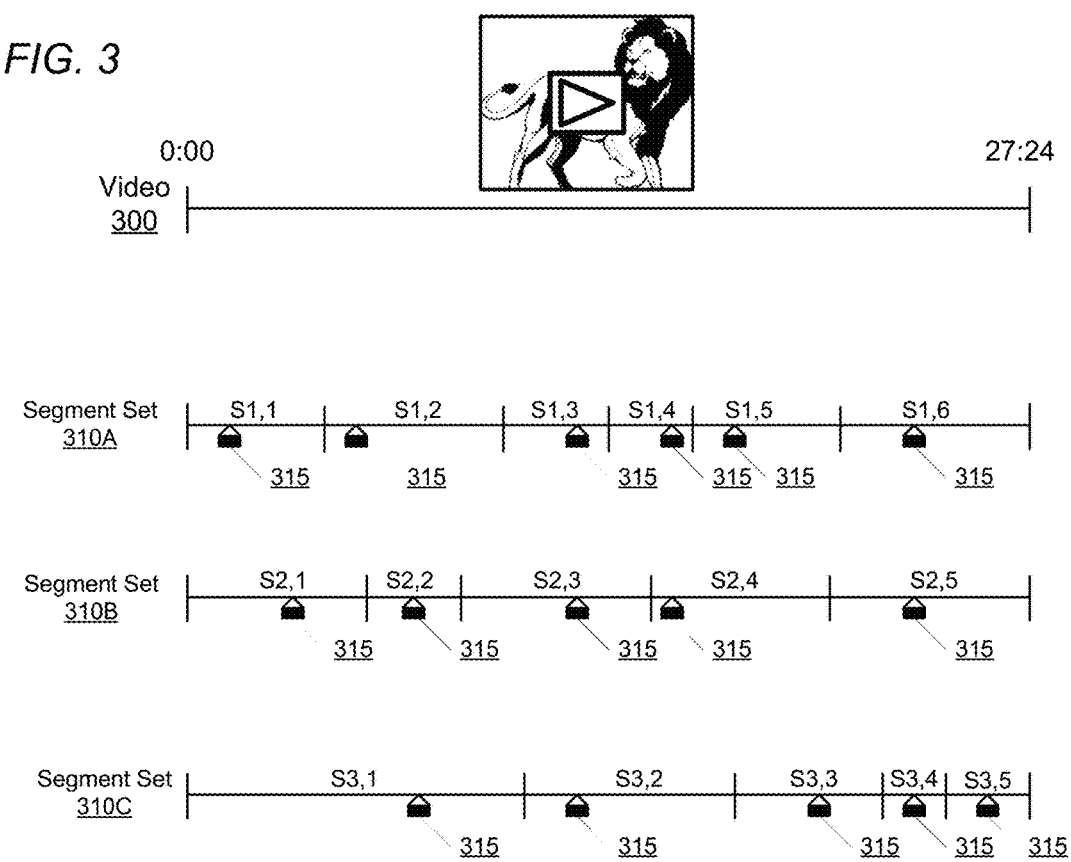
FIG. 3 illustrates the generation of a segment table indicating representative frames for a segments of a video, according to one embodiment.

FIG. 3 illustrates the generation of a segment table indicating representative frames for video segments of a video according to one embodiment. In this example, a video 300 includes a variety of animals. The video is analyzed by the video segmentation module 122 using several methods of identifying video segments, which yields identified video segment sets 310A-C. For each video segment in the set, a representative frame 315 is identified by the frame selection module 124 as described above. Since the various methods of segmentation may identify different boundaries within the video 300, different representative frames may be selected for the various segments, as shown. The segments and representative frames are stored in a segment table 320, which identifies the segments, a representative frame for each segment, and a set of semantic concepts associated with the representative frame.

Figure 4:
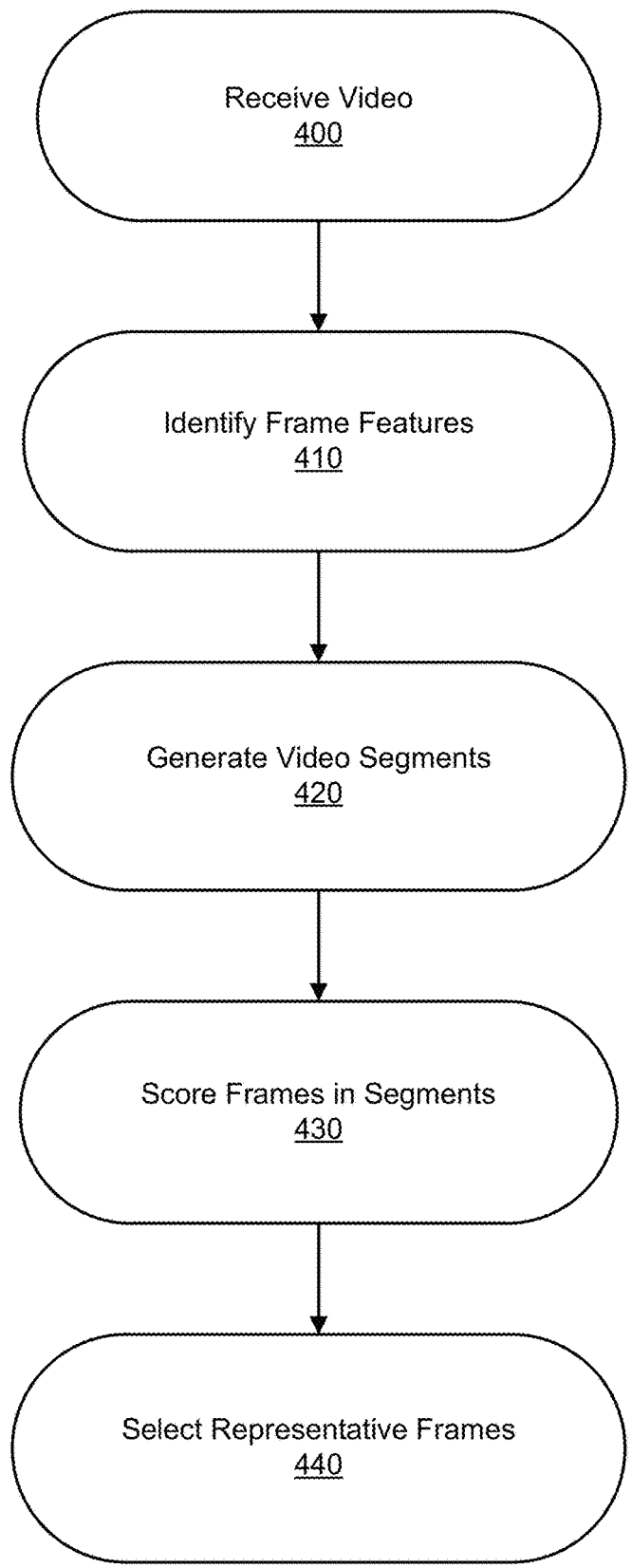
FIG. 4 illustrates a method for identifying representative frames, according to one embodiment.

FIG. 4 illustrates a method for identifying representative frames according to one embodiment. This method is performed by the feature extraction module 120, video segmentation module 122, and frame selection module 124 in the embodiment described with respect to FIG. 1. Initially, a video is received 400 for identification of representative frames. The video may be received for identification of representative frames responsive to the video being uploaded to the video hosting service 100, or may be received at another time after upload. Features are identified 410 for the video as described above, including frame-based features and semantic features identifying semantic concepts present in the frame. The semantic features may be determined from the frame-based features, for example, by applying semantic classifiers to frame-based features identified for a frame to determine one or more semantic features for the frame. The video features are analyzed by the video segmentation module 122 to generate video segments 420, which may include multiple sets of segments as determined by multiple video segmentation methods. For the identified segments, the frames in the segment are scored 430 to generate semantic scores. In one embodiment, the semantic score includes a combined score incorporating an aesthetic score of the frame. Using the scores associated with the frames in a segment, a representative frame for a segment is selected 440 from the frame with the highest score. The identified segments and representative frames may be added to a segment table for the video.

Returning to FIG. 1, the video summary module 126 uses the segment table to generate a preview of a video for a user. The video preview is used to generate a "storyboard" of a video to depict representative frames of the video, and may select representative frames that are related to a search query provided by a user or related to interests of a user.

The video summary module 126 receives a request to generate a preview of a video. The request may be provided from the front end interface when a user browses videos on the video hosting service 100, or may be provided from the video search module 106 to generate a preview for results of a search for a video. The request to generate a preview indicates a video for which to generate a preview, and may include a search query or an identification of a requesting user in the user database 114.

After receiving a request to summarize the video, the video summary module 126 identifies segments of the video relevant to the request. When no search query is received, all segments may be considered relevant. Alternatively, the metadata associated with the video, e.g., the title and any tags associated with the video, may be selected as relevance terms to use for determining relevance of the segments and representative frames. When a search query is received, the search query is translated into relevance terms to identify relevance terms to analyze the videos and identify which semantic concepts are described by the search query. In addition, an identified requesting user may be associated with interests in the user database 114. The various relevance terms are translated into semantic concepts to determine relevance of segments of the video. The translated relevance terms are compared to the semantic concepts associated with the representative frames of the segments of the video. The video summary module 126 identifies representative frames including concepts that match the semantic concepts of the relevance terms as relevant segments and uses these segments as potential segments to generate a preview of the video.

After identifying relevant segments of the video, the video summary module 126 identifies which relevant segments (and representative frames) will be used to generate a preview of the video. To select representative frames for the preview, the video summary module 126 generates a relevance score for the representative frames for a segment. The relevance score is calculated using the metadata, query, or user interests relative to the semantic features of the representative frame. This relevance score matches the semantic features of the metadata, query, or user interests to the semantic features. The relevance scores are ranked, and a highest-ranked relevance score is selected as a representative frame. In addition, the semantic concepts of the selected frames can be used in selection of other representative frames. In one application, the selection of frames emphasizes diversity of semantic concepts among the selected frames. For example, frames with different semantic concepts as already selected frames may be preferred to frames with similar semantic concepts. A designated number of representative frames are selected to represent the video, such as 3 or 5.

The selected frames may also be chronologically organized for display to the user. In one embodiment, the video summary module 126 generates a video summary by generating an animation using the selected representative frames. The animation provides a brief overview to the user of the representative frames for the video and permits the user to quickly determine whether the user is interested in the video.

In one embodiment, the video summary module also determines whether to replace a default thumbnail for a video based on the selected representative frame. Each video may be associated with a default thumbnail, which may be designated by a user uploading the video or may be selected based on semantic of aesthetic features of the video. The video summary module 126 determines whether to replace the default thumbnail in some embodiments by comparing a relevance score of the selected representative frames to a relevance score calculated with respect to the default thumbnail. The relevance scores may be calculated with respect to the video metadata, search query, or user interests as described above. When the representative frame relevance score is higher than the default thumbnail by a threshold value, the representative frame is selected as a replacement thumbnail for display.

In one embodiment, rather than determining the representative segments based on query terms or user interests, the query terms and user interests are incorporated into the scoring for the selection of representative frames for the preview and increase the scoring for representative frames in the preview, and do not affect the representative segments selected as relevant. That is, the semantic concepts associated with the query or user interests are used to increase the score of representative frames that match the semantic concepts of the query or user interests.

Figure 5:
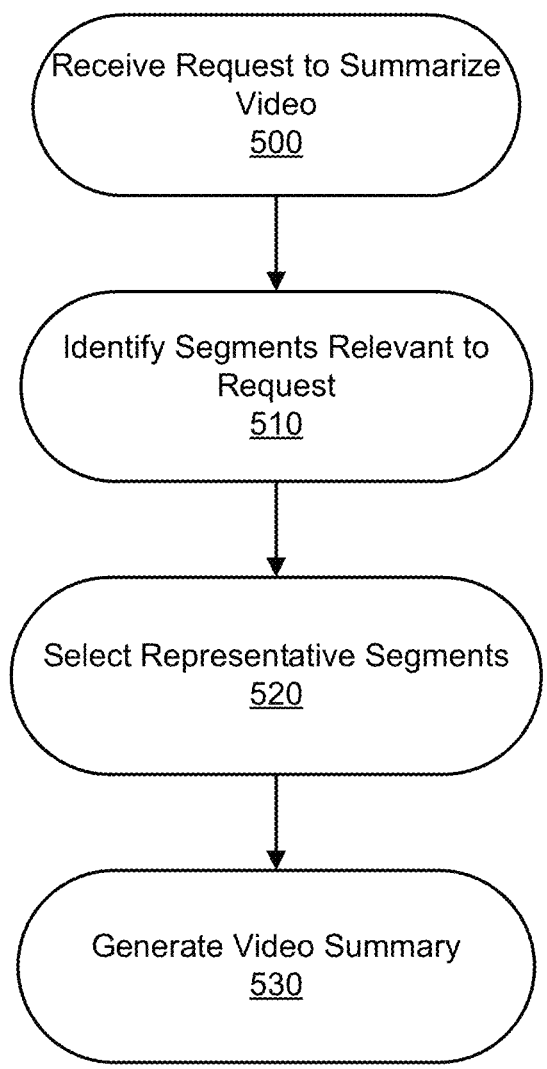
FIG. 5 shows a method for selecting representative frames from a segment table for display to a user, according to one embodiment.

FIG. 5 shows a method for selecting representative frames from a segment table for display to a user according to one embodiment. In the embodiment shown in FIG. 1, this method is performed by the video summary module 126. Initially, a request is received 500 to summarize a video and provide a preview to a user. The request may designate a search query and/or a user requesting the video. Next, segments that are relevant to the request are identified 510 based on the search query, user interests of the user requesting the video, or metadata associated with the video. The segments may be identified by comparing the semantic concepts associated with the segments to the semantic concepts associated with the request. For example, the semantic concepts associated with the segments may be identified from a segment table including segments of videos, representative frames for the segments, and associated semantic concepts for the segments. The semantic concepts associated with the request may be determined by analyzing the search query or user interest information, or by identifying semantic concepts associated with metadata of the video.

Representative segments are selected 520 from the segments determined to be relevant to the request. The segments that are relevant to the request are scored and selected based on relevance to the video metadata and the user's context (e.g., the user's search query or user interests). For example, the segments relevant to the request are scored based on the match between the segment and the semantic concepts associated with the query. The segments with the highest score and reflecting a diversity of semantic concepts are selected. The representative frames associated for the selected representative segments can be determined from the segment table. The video summary module 126 generates a video summary 530 using the representative frames for the selected representative segments. The video summary chronologically combines the representative frames and may present a series of the representative frames to the user, for example, in a static "storyboard" or by combining the frames into an animation that sequentially transitions from one frame to another. The video summary is provided to the user who determines whether or not to view the entire the video.

Figure 6:
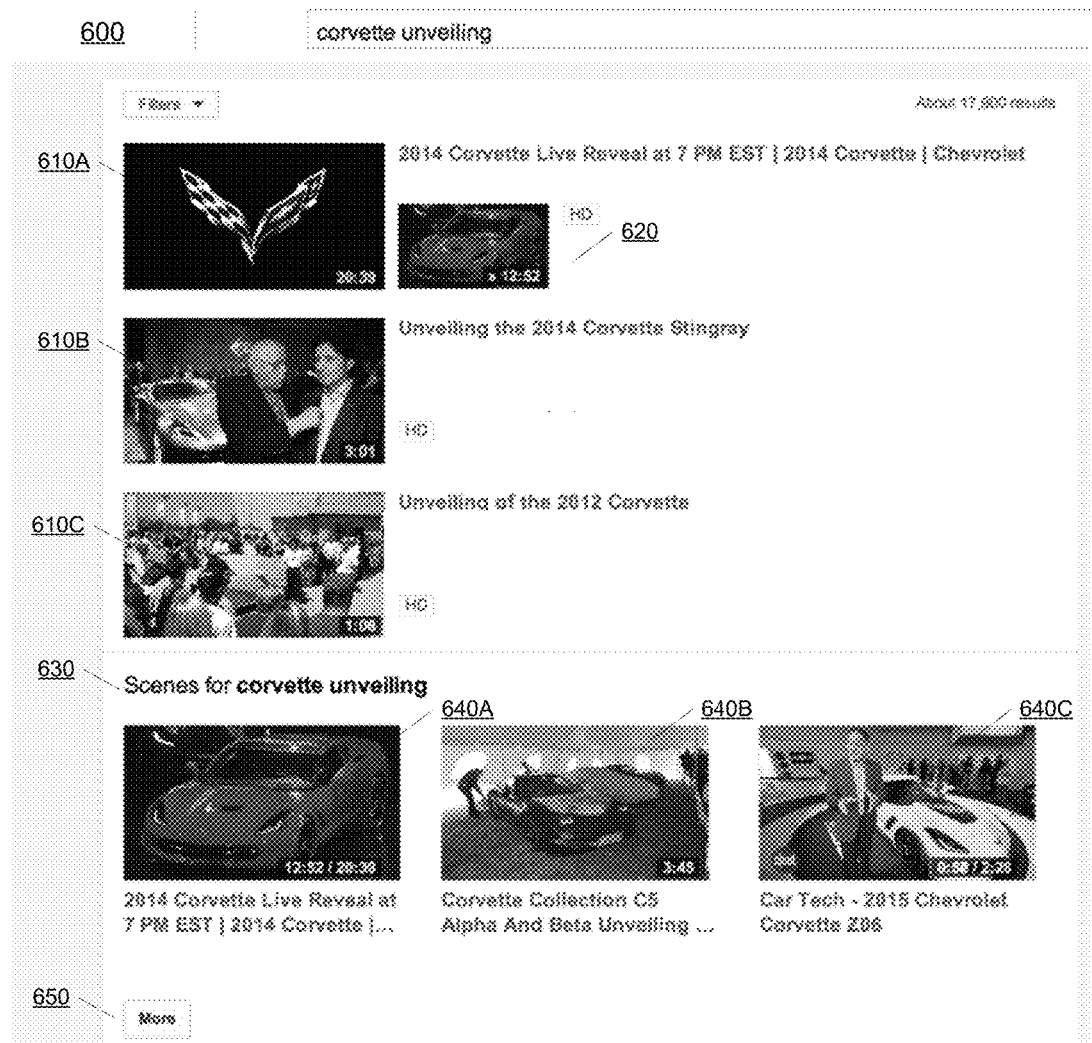
FIG. 6 shows a video preview interface including representative frames of a video, according to one embodiment.

FIG. 6 shows a video preview interface 600 including representative frames of video according to one embodiment. The video preview interface 600 is provided to a client device 135 for browsing videos and determining whether to view a video in full based on the video preview. In this example, a user entered a search query of "corvette unveiling" and several videos were determined as responsive to the request. The search query and resulting videos are provided to the video summary module 126 for selection of representative frames and a preview of the videos.

In this example, a set of three videos 610A-610C is selected as relevant in a first portion of the display. Each of the relevant videos is analyzed to determine representative frames and a relevance score for each representative frame. The relevance score may be determined as described above to identify frames relevant to the search query or user profile. In this example the video summary module 126 selects a representative frame 620 to accompany a video in the display when the representative frame exceeds a threshold relevance score. In this example, the video summary module 126 selects the frame to present on video preview interface 600 that has the highest relevance score over the threshold relevance score. Also shown in this example, videos 610B and 610C did not have a representative frame with a relevance score higher than the threshold relevance score, and are not shown in the preview interface with a representative frame 620.

In another portion of the video preview interface 600, a scene preview 630 is displayed to the user. The scene preview 630 may be shown in addition to the relevant videos 610A-C, or may be shown a separate interface or display. In this example, the scene preview 630 displays a thumbnail 640 of the relevant search results. In this example, the default thumbnail is replaced with a representative frame for each video. Thus each displayed thumbnail 640A-C are the representative frames for each of the search results that has the highest relevance score. To generate the thumbnails 640, the video summary module 126 generates relevance scores for each segment in the relevant videos and selects the highest-scoring representative frame. The representative frame replaces the default thumbnail image for display in the scene preview 630. In this way, the scene preview 630 presents each video summarized by the representative frame that best summarizes the video relative to the search query entered by the user. When a user selects a representative frame, the user may be shown the video and playback of the video begins at the representative frame, permitting the user to jump to the representative frame in the video. In a variation, selecting the representative frame begins playback at the beginning of the segment containing the representative frame. As noted above, the relevance score may also account for the user profile and other information to determine the relevance score. In addition, while the scene preview 630 is shown here as a portion of the video preview interface 600, in this embodiment an interface element 650 permits a user to view additional videos summarized by representative frames. This interface element 650 provides the user with additional search results that also have default thumbnails replaced with query- or user-specific representative frames.

Figure 7A:
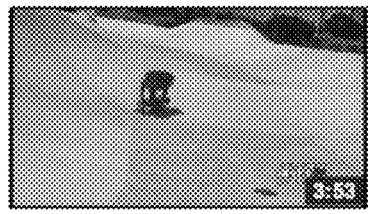
FIG. 7A shows another video preview interface including representative frames of a video, according to one embodiment.
Figure 7A:
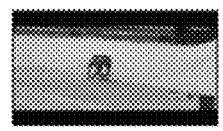
Figure 7A:
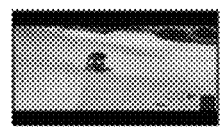
Figure 7A:
Figure 7A:
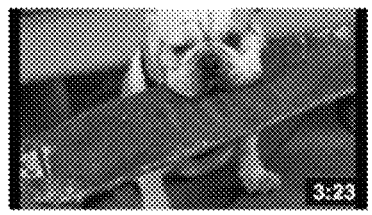
Figure 7A:
Figure 7A:
Figure 7A:
Figure 7A:
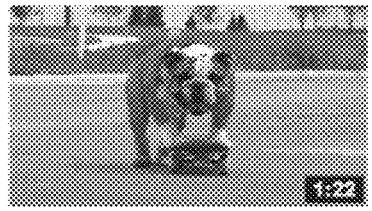
Figure 7A:
Figure 7A:
Figure 7A:
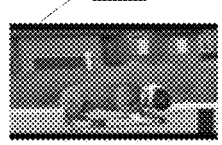

FIG. 7A shows another video preview interface 700 including representative frames of a video according to one embodiment. The video preview interface 700 is provided to a client device 135 for browsing videos and determining whether to view a video in full based on the video preview. In this example, a user entered a search query of "bulldog skateboarding" and several videos were determined as responsive to the request. The search query and resulting videos are provided to the video summary module 126 for selection of representative frames and a preview of the videos. In this embodiment, a set of representative frames, 710A, 710B, and 710C is provided to the user as a preview of the respective videos. That is, rather than selecting a single representative frame as shown in FIG. 6, in this embodiment multiple frames of a video may be selected and presented to a user. This permits the user to determine which of the videos and a particular representative frame within the video that the user would like to view. When a user selects a representative frame, the user may be shown the video and playback of the video begins at the representative frame, permitting the user to jump to the representative frame in the video or the segment containing the representative frame. By showing the representative frames that are related to the user's request, the user can quickly decide from the video preview interface 700 which of these videos the user would like to view. In addition, as the representative video segments in one embodiment are determined prior to the search request, the video hosting system 100 can determine representative frames for the video preview interface 700 without significant frame-by-frame processing at the time of the search query.

Figure 7B:
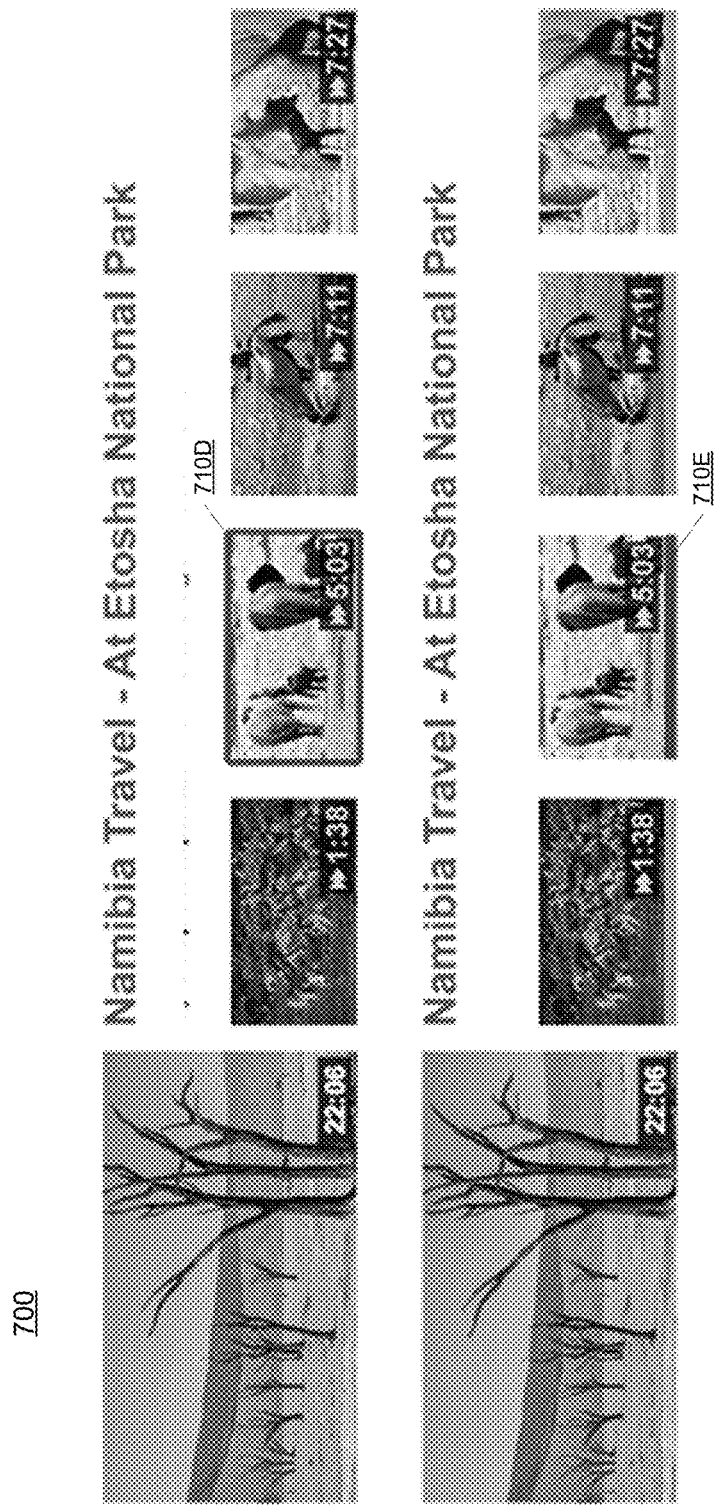
FIGS. 7B-7D show further interfaces for presenting representative frames of a video, according to various embodiments.
Figure 7C:
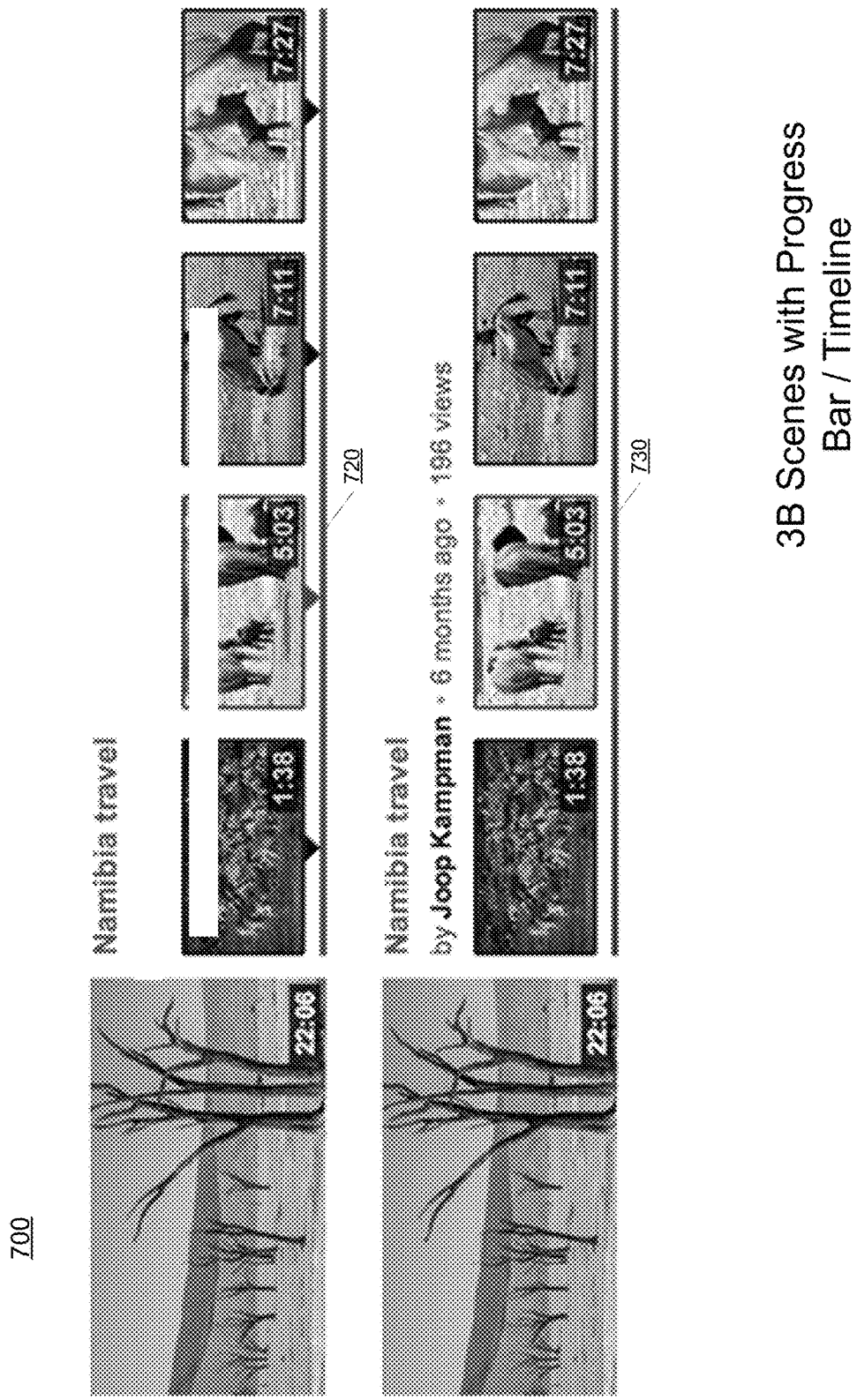
Figure 7D:
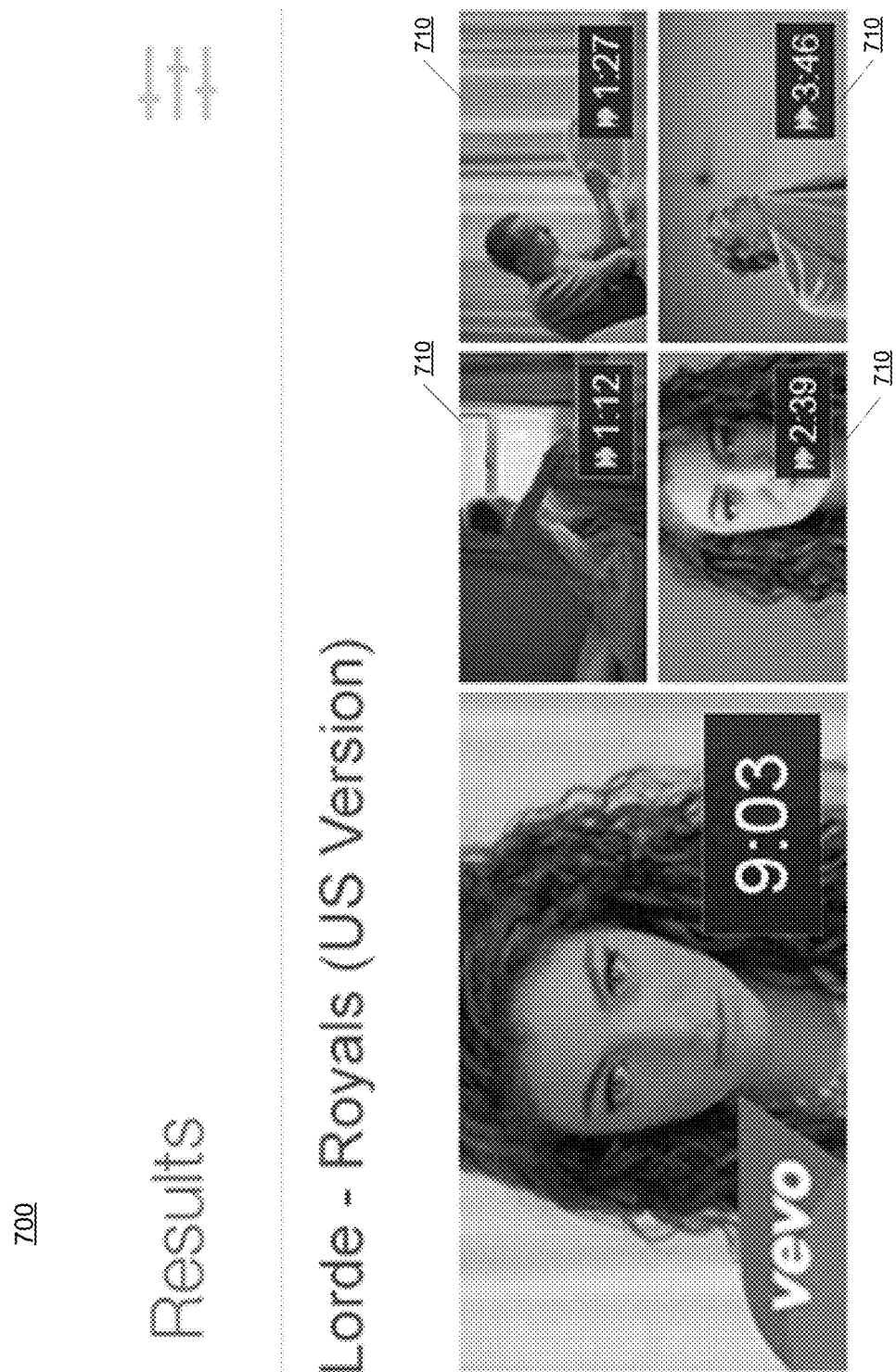

FIGS. 7B-7D show further interfaces for presenting representative frames of a video according to various embodiments. As shown in FIG. 7B, a representative frame 710 may be designated or highlighted by the video hosting service 100 as particularly relevant to the user or the user's search, in this example "elephant" or "Namibia elephant." In this example, representative frames 710D and 710E are highlighted, by an outline in representative frame 710D and by an underline in 710E. To generate these interfaces, the video summary module 126 determines the set of representative frames for the user and generates the relevance score associated with the representative frames. The representative frames are ranked by the relevance score, and the highest-ranked representative frame is identified and presented to the user with a highlight. The representative frames are shown here as ordered chronologically, but may also be ordered according to the relevance score of the representative frames. FIG. 7C shows a selection of representative frames for a video. As shown in FIG. 7C, the video preview interface 700 includes a timeline 720 or progress bar 730 that indicate when in a video the particular representative frames occur. FIG. 7D illustrates another video preview interface 700 in which the representative frames 710 are displayed in a grid configuration.

Figure 8:
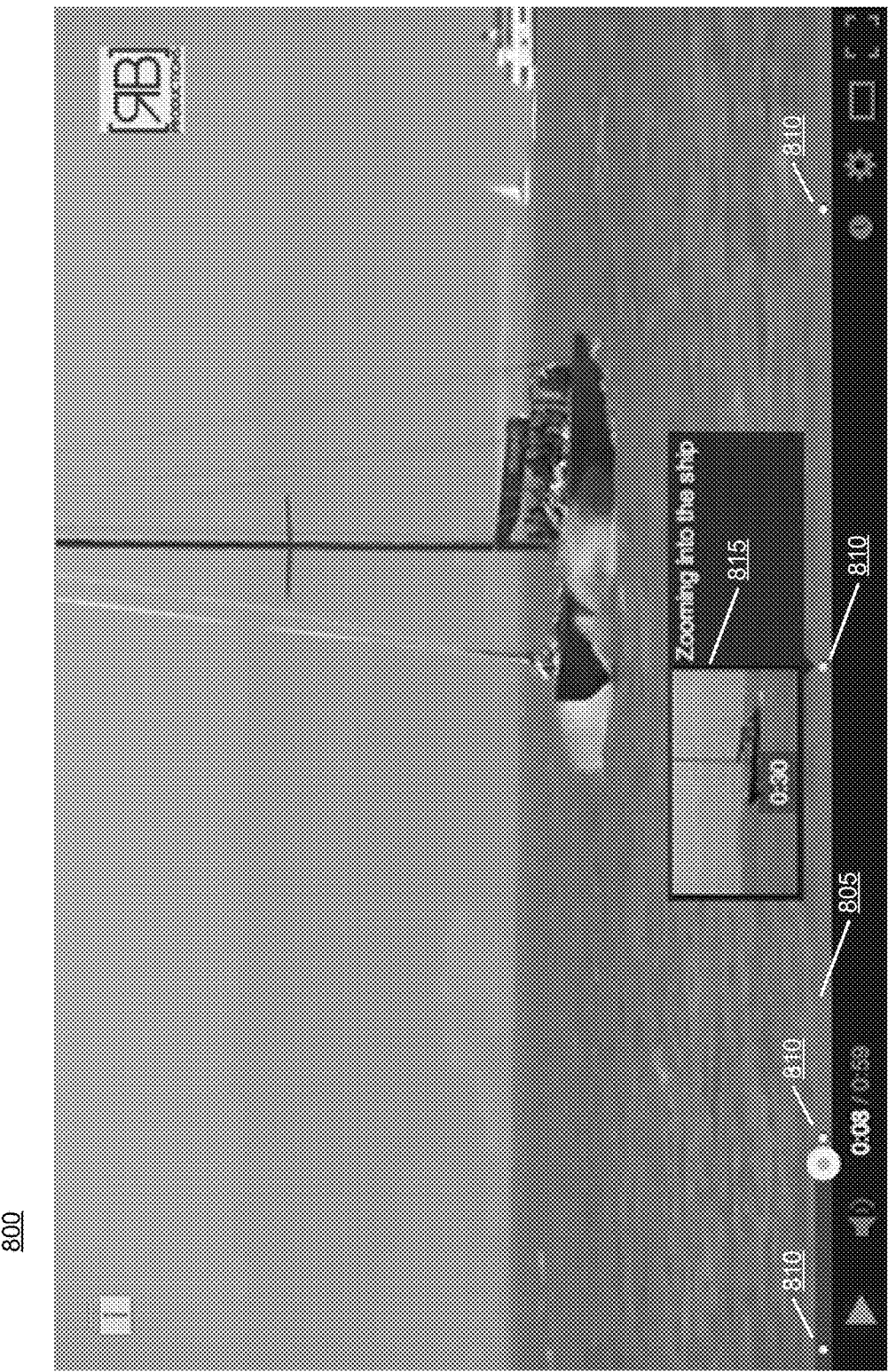
FIG. 8 shows an interface for providing a representative frame within a player interface, according to one embodiment.

FIG. 8 shows an interface for providing a representative frame within a player interface 800 according to one embodiment. The player interface 800 is the interface that a user interacts with to play the video and adjust controls for the video, such as volume, start, stop, seek, and other actions. The player interface 800 also includes a progress bar 805 that indicates the length of the video and the portion of the video that has been viewed. The video summary module 126 identifies one or more representative frames which may be indicated within the player interface 800. In this example, the time in the video at which a representative frame occurs is indicated by a marker 810 on the progress bar 805. When a user interacts with the market 810, the representative frame 815 is displayed to the user, which may also include a description of the semantic concepts or actions identified for the representative frame. The user's interaction used to display the representative frame varies in different implementations, and may be a user's cursor detected at the position of the marker 810 for more than a threshold period of time (e.g., hovering) or may be a user clicking on the marker 810.

Figure 9:
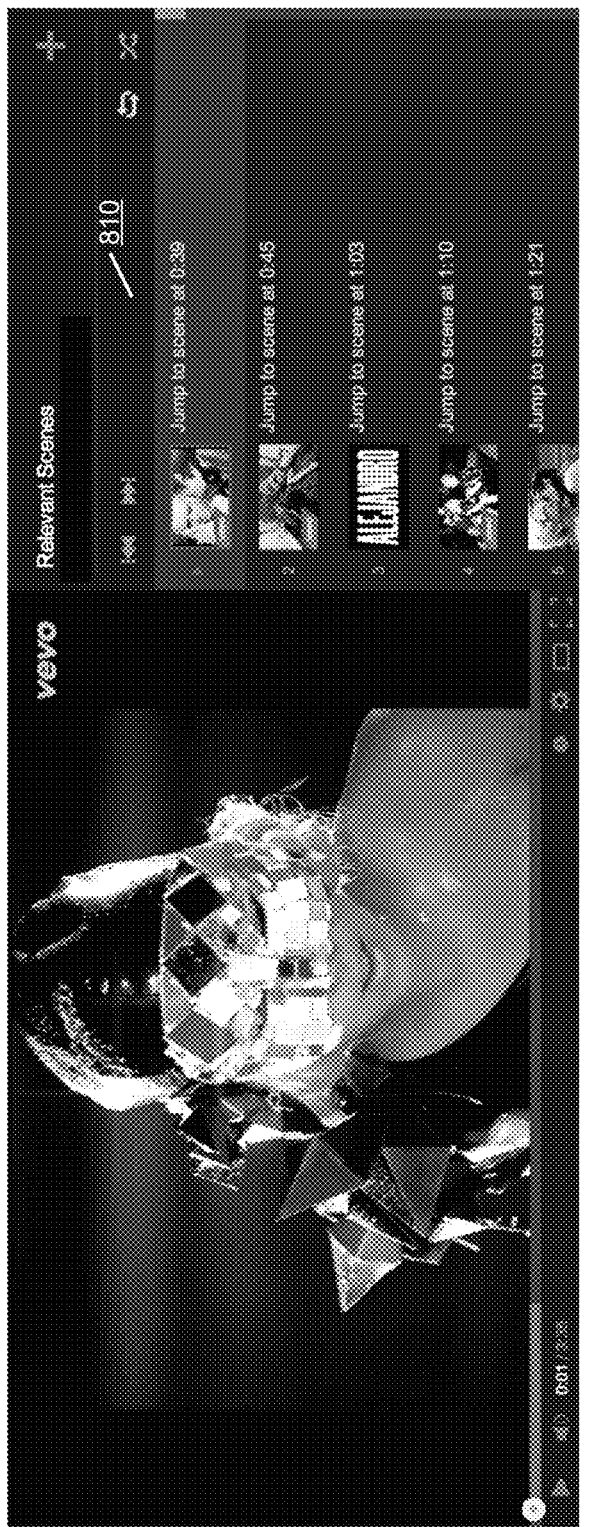
FIG. 9 shows an interface for providing representative frames for a video with a player interface, according to one embodiment.

FIG. 9 shows an interface for providing representative frames for a video with a player interface 900 according to one embodiment. In this example, rather than providing markers in the progress bar of a video, the representative frames are displayed as a list 910. The list of representative frames may also be sorted according to the relevance score of the frames. As indicated above, the list of representative frames may be selected based on the user's profile, a search, or other indications of frames that may be of interest to the user. The list of representative frames permits a user to review and select a select a representative frame without impacting the viewing area of the video. In addition, when a user selects a representative frame, the video hosting service 100 begins playback of the video at the time of the representative frame or related segment, permitting the user to quickly seek the portion of the video of interest to the user. Using the various techniques described herein, users can effectively identify portions of a video that are of interest to the user, and are query or user specific. These portions of the video are presented to the user in ways that permit the user to determine whether the representative frames for one or more videos are of interest to the user.

The present disclosure has been described in particular detail with respect to one possible embodiment. Those of skill in the art will appreciate that the disclosure may be practiced in other embodiments. First, the particular naming of the components and variables, capitalization of terms, the attributes, data structures, or any other programming or structural aspect is not mandatory or significant, and the mechanisms that implement the disclosure or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component. As described herein, the term "a set of" means one or more.

Some portions of above description present the features of the present disclosure in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present disclosure include process steps and instructions described herein in the form of an algorithm. It should be noted that the process steps and instructions of the present disclosure could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of non-transient computer-readable storage medium suitable for storing electronic instructions. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present disclosure is intended to be illustrative, but not limiting, of the scope of the disclosure, which is set forth in the following claims.

What is claimed is:

1. A computer-implemented method for selecting representative frames for videos, comprising:
    receiving a video including a set of frames;
    identifying a set of features for each of the frames of the video, wherein the set of features includes frame-based features and semantic features, and wherein each of the semantic features for a frame is identified by (i) transmitting a designation of the frame associated with the frame-based features to a plurality of semantic classifiers, (ii) receiving, from each of the plurality of semantic classifiers, a likelihood of a semantic concept being depicted in the frame of the video, and (iii) assigning a label corresponding to the semantic concept to the frame of the video based on the likelihood of the semantic concept being depicted in the frame of the video;
    generating a set of video segments for the video, each video segment including a chronological subset of frames from the video, and each frame associated with at least one of the semantic features;
    generating, for each video segment in the set of video segments, a score for each frame of the subset of frames of the video segment based at least on the semantic features;
    selecting a plurality of representative frames of the video, wherein each representative frame for each video segment in the set of video segments is selected based on the scores for the frames in the video segment, the representative frame representing and summarizing the video segment; and generating a summarized video that combines at least a portion of the plurality of representative frames of the video.

2. The method of claim 1, further comprising generating a segment table for the video, the segment table storing the representative frames for the video segments of the video and the set of semantic concepts associated with each of the representative frames.

3. The computer-implemented method of claim 1, wherein the frame-based features comprise at least one of:
a visual feature comprising at least one from the group consisting of a color histogram, a histogram of oriented gradients, color-differencing of a frame with adjacent frames, motion features, or feature tracking, and;
an audio feature comprising at least one from the group consisting of a volume, an audio spectrogram, a speech-no-speech indicator, or a stabilized auditory image.

4. The computer-implemented method of claim 1, wherein the
label corresponds to an entity or free text.

5. The computer-implemented method of claim 1, wherein the step of generating the set of video segments comprises:
analyzing the frame-based features to determine a set of shot boundaries within the video;
wherein a shot includes a set of sequential frames and a shot boundary indicates a frame between neighboring shots.

6. The computer-implemented method of claim 5, wherein the step of determining the set of shot boundaries comprises:
applying a classifier to frames associated with frame-based features to determine whether a frame is a shot boundary;
wherein the classifier is trained using labeled shot boundaries as a positive feature set and frames near the shot boundaries as a hard-negative training set, and
wherein the frame-based features comprise color differences with adjacent frames, motion features, audio volume, and audio speech detection.

7. The computer-implemented method of claim 5, wherein the step of determining the set of shot boundaries comprises:
analyzing a coherence of the frame-based features;
wherein the coherence measures similarity of frame-based features in a predetermined temporal segment, and
wherein the similarity provides a distance measure for segmenting the video.

8. The computer-implemented method of claim 5, wherein the step of determining the set of shot boundaries comprises:
tracking the frame-based features across the series of frames of the video; and
wherein a frame is determined as a shot boundary when a change of frame-based features between the frame and neighboring frames is greater than a threshold.

9. The computer-implemented method of claim 1, wherein the score comprises a semantic score and the step of generating the semantic score for the frame comprises:
identifying a set of semantic concepts for a video segment containing the frame by comparing each semantic feature generated for the chronological subset of frames included in the video segment to a threshold, each semantic concept of the set having the corresponding semantic feature greater than the threshold;
for each semantic concept of the set, determining a frame-level score for each frame of the chronological subset of frames in the video segment by determining an amount the semantic concept being present in the frame compared to a reference value; and
determining the semantic score for the frame by aggregating the frame-level scores of the frames in the segment.

10. The computer-implemented method of claim 1, wherein the step of generating the score for the each frame comprises combining semantic concepts and corresponding likelihood in the frame.

11. The computer-implemented method of claim 1, wherein the score combines a semantic score and an aesthetic score and the step of generating the score for the each frame comprises:
calculating the semantic score based on the determined semantic features;
calculating the aesthetic score using a set of quality measures comprising at least one from the group consisting of sharpness, an amount of motion, distance from a segment boundary, and photo quality; and
combining the semantic score and the aesthetic score.

12. The computer-implemented method of claim 1, further comprising presenting the representative frame of a video segment responsive to receiving a request for the video segment.

13. A non-transitory computer-readable storage medium comprising computer program instructions executable by a processor, the computer program instructions comprising:
receiving a video including a set of frames;
identifying a set of features for each of the frames of the video, wherein the set of features includes frame-based features and semantic features, and wherein each of the semantic features for a frame is identified by (i) transmitting a designation of the frame associated with the frame-based features to a plurality of semantic classifiers, (ii) receiving, from each of the plurality of semantic classifiers, a likelihood of a semantic concept being depicted in the frame of the video, and (iii) assigning a label corresponding to the semantic concept to the frame of the video based on the likelihood of the semantic concept being depicted in the frame of the video;
generating a set of video segments for the video, each video segment including a chronological subset of frames from the video, and each frame associated with at least one of the semantic features;
generating, for each video segment in the set of video segments, a score for each frame of the subset of frames of the video segment based at least on the semantic features;
selecting a plurality of representative frames of the video, wherein each representative frame for each video segment in the set of video segments is selected based on the scores for the frames in the video segment, the representative frame representing and summarizing the video segment; and
generating a summarized video that combines at least a portion of the plurality of representative frames of the video.

14. The non-transitory computer-readable storage medium of claim 13, wherein the computer program instructions further comprise generating a segment table for the video, the segment table storing the representative frames for the video segments of the video and the set of semantic concepts associated with each of the representative frames.

15. The non-transitory computer-readable storage medium of claim 13, wherein the step of identifying the set of features comprises:
applying a plurality of semantic classifiers to determine the semantic features, wherein a semantic classifier receives a designation of a frame associated with frame-based features and outputs a likelihood the frame is relevant to or depicts a semantic concept, and wherein the semantic concept is a label assigned to the content of the video and corresponds to an entity or free text.

16. The non-transitory computer-readable storage medium of claim 13, wherein the step of generating the set of video segments comprises:
analyzing the frame-based features to determine a set of shot boundaries within the video;
wherein a shot includes a set of sequential frames and a shot boundary indicates a frame between neighboring shots.

17. The non-transitory computer-readable storage medium of claim 16, wherein the
label corresponds to an entity or free text.

18. The non-transitory computer-readable storage medium of claim 16, wherein the step of determining shot boundaries comprises:
analyzing a coherence of the frame-based features;
wherein the coherence measures similarity of frame-based features in a predetermined temporal segment, and
wherein the similarity provides a distance measure for segmenting the video.

19. The non-transitory computer-readable storage medium of claim 13, wherein the score comprises a semantic score and the step of generating the semantic score for the frame comprises:
identifying a set of semantic concepts for a video segment containing the frame by comparing each semantic feature generated for the chronological subset of frames included in the video segment to a threshold, each semantic concept of the set having the corresponding semantic feature greater than the threshold; and
for each semantic concept of the set, determining a frame-level score for each frame of the chronological subset of frames in the video segment by determining an amount the semantic concept being present in the frame compared to a reference value; and
determining the semantic score for the frame by aggregating the frame-level scores of the frames in the segment.

20. A system comprising:
a processor for executing computer program instructions; and
a non-transitory computer-readable storage medium comprising computer program instructions executable by the processor, the computer program instructions comprising:
receiving a video including a set of frames;
identifying a set of features for each of the frames of the video, wherein the set of features includes frame-based features and semantic features, and wherein each of the semantic features for a frame is identified by (i) transmitting a designation of the frame associated with the frame-based features to a plurality of semantic classifiers, (ii) receiving, from each of the plurality of semantic classifiers, a likelihood of a semantic concept being depicted in the frame of the video, and (iii) assigning a label corresponding to the semantic concept to the frame of the video based on the likelihood of the semantic concept being depicted in the frame of the video;
generating a set of video segments for the video, each video segment including a chronological subset of frames from the video, and each frame associated with at least one of the semantic features;
generating, for each video segment in the set of video segments, a score for each frame of the subset of frames of the video segment based at least on the semantic features;
selecting a plurality of representative frames of the video, wherein each representative frame for each video segment in the set of video segments is selected based on the scores for the frames in the video segment, the representative frame representing and summarizing the video segment; and
generating a summarized video that combines at least a portion of the plurality of representative frames of the video.

* * * * *